(12) United States Patent
Awadalla

(10) Patent No.: US 9,352,332 B2
(45) Date of Patent: May 31, 2016

(54) MAGNETIC FLUID PARTICULATE SEPARATOR APPARATUS

(71) Applicant: Toyota Motor Engineering & Manufacturing North America, Inc., Erlanger, KY (US)

(72) Inventor: Hesham Ahmed Awadalla, Oakville (CA)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 335 days.

(21) Appl. No.: 13/916,552

(22) Filed: Jun. 12, 2013

(65) Prior Publication Data

US 2014/0367339 A1 Dec. 18, 2014

(51) Int. Cl.
  *B03C 1/16* (2006.01)
  *B03C 1/18* (2006.01)
  *B03C 1/12* (2006.01)
  *B01D 33/00* (2006.01)
  *B01D 33/048* (2006.01)
  (Continued)

(52) U.S. Cl.
  CPC .............. *B03C 1/18* (2013.01); *B01D 33/0025* (2013.01); *B01D 33/048* (2013.01); *B03C 1/10* (2013.01); *B03C 1/12* (2013.01); *B01D 33/46* (2013.01); *B03C 2201/18* (2013.01); *B03C 2201/20* (2013.01)

(58) Field of Classification Search
  CPC .............. B03C 1/10; B03C 1/12; B03C 1/16; B03C 1/18; B03C 1/247; B03C 1/26; B03C 2201/18; B03C 2201/20; B01D 35/06; B01D 33/0022; B01D 33/0025; B01D 33/0067; B01D 33/044; B01D 33/048; B01D 33/46; B01D 33/466; B01D 33/803
  See application file for complete search history.

(56) References Cited

U.S. PATENT DOCUMENTS 2,268,128 A * 12/1941 Reeves ...................... B03C 1/18
  209/219
2,309,923 A * 2/1943 Robertson ................. B03C 1/18
  209/232
2,720,973 A * 10/1955 Gross ................... B01D 29/096
  210/223

(Continued)

FOREIGN PATENT DOCUMENTS

DE 3036976 A1 * 5/1982
DE 3418182 11/1985

(Continued)

OTHER PUBLICATIONS

KFactor Filter, KFactor Filter Filtration, advertisement, undated, printed from www.kfactorfilter.com on Sep. 13, 2012 in 4 pages.

(Continued)

*Primary Examiner* — David C Mellon
(74) *Attorney, Agent, or Firm* — Christopher G. Darrow; Darrow Mustafa PC

(57) ABSTRACT

An apparatus and method for removing solids and particulates from fluid by magnetic separation. First and second spaced rotatable drums move a closed loop belt. A portion of the belt is disposed in contact with the fluid flowing through a fluid passage disposed adjacent to a circumferential portion of the first rotatable drum where solids and particulates in the fluid are attracted to the belt by magnetic attraction from a magnetic source within the first rotatable drum. A wiper scrapes the solids deposited on the belt.

8 Claims, 4 Drawing Sheets

(51) Int. Cl.
    *B03C 1/10*     (2006.01)
    *B01D 33/46*     (2006.01)

(56) References Cited

U.S. PATENT DOCUMENTS

| | | | |
|---|---|---|---|
| 3,358,838 A * | 12/1967 | Kosar | B01D 17/0202 210/179 |
| 3,377,651 A * | 4/1968 | Ireland | B03C 1/10 209/226 |
| 3,876,547 A | 4/1975 | Kasess | |
| 4,005,018 A | 1/1977 | Wyman et al. | |
| 4,158,629 A | 6/1979 | Sawyer | |
| 4,233,157 A | 11/1980 | Miller | |
| 4,267,060 A | 5/1981 | Miller | |
| 4,343,701 A | 8/1982 | Parshall | |
| 4,421,647 A | 12/1983 | Estabrook et al. | |
| 4,481,108 A | 11/1984 | Bratten | |
| 4,681,679 A | 7/1987 | Reber | |
| 4,973,407 A | 11/1990 | Wagner | |
| 5,683,581 A | 11/1997 | Schimion et al. | |
| 2003/0146174 A1 | 8/2003 | Hansen et al. | |
| 2006/0076285 A1 | 4/2006 | Lewandowski | |
| 2008/0149548 A1 | 6/2008 | White | |
| 2010/0224574 A1 | 9/2010 | Youngs et al. | |

FOREIGN PATENT DOCUMENTS

| | | | |
|---|---|---|---|
| EP | 133869 | | 3/1985 |
| GB | 869210 A | * | 5/1961 |
| GB | 2174014 A | | 10/1986 |
| JP | 2005058880 | | 3/2005 |

OTHER PUBLICATIONS

KFactor Filter, Maggie Liquid Filtration, advertisement, printed from www.kfactorfilter.com on Sep. 13, 2012 in 4 pages.

\* cited by examiner

MAGNETIC FLUID PARTICULATE SEPARATOR APPARATUS

BACKGROUND

The following description relates, in general, to fluid particulate filters and separators.

Filtration apparatus is used to remove solid contaminates from fluids used in manufacturing operations. In automobile assembly plants, the assembled sheet metal vehicle body is washed prior to painting operations. Other industrial operations involve machining of parts. The machined parts are washed to remove chips, cutting fluid residue, and other solids and particulate material.

In order to conserve resources, the wash fluid is recycled. The fluid is passed through a filtration apparatus which removes solids and other particulate materials so that the cleaned fluid may be recycled for further use in the industrial operations.

One type of filtration apparatus used in industrial operations is a flatbed type filter in which a filter media in the form of a thin, porous strip is indexed through a chamber containing a reservoir of fluid from industrial operations. Gravity or pressure pulls the fluid through the filter media thereby removing solids and particulates from the fluid. The cleaned fluid is then recycled to the industrial operation. The solids and particulates collect on the filter media and are removed dirty as the filter media indexes out of the filtration apparatus.

Due to the high volume of wash fluid that is passed through the filter media for cleaning, the filter media rapidly clogs with the solids and particulates removed from the industrial fluid. The filter media is frequently indexed to bring clean filter media into the chamber to continue to clean the wash fluid. The solids and particulates form a cake or residue in the filter media which retains the solids and particulates in the filter media as the filter media exits the chamber to a waste receptacle.

Due to the porosity of the filter media, which may be as low as 10 microns, small particulates, particularly, metal particulates, can pass through the filter media, and then be recycled with the clean fluid back to the industrial operation.

Another type of fluid particulate filter or separator apparatus uses a magnetic wet drum system. The magnetic drum sits in a fluid passage through which fluid contaminated with metallic particles and dirt flows. The magnetic drum is continuously rotated and collects metal particles and other debris due to magnets mounted interiorly within and across the longitudinal length of the drum.

A wiper is positioned on an opposite portion of the drum to scrape off the collected metal particles and dirt.

However, due to the continuous rotation of the drum, only a limited amount of particulates can be removed from the fluid, thereby necessitating low fluid flow rates. This may interfere with the machine operation which uses the fluid or requires larger fluid holding tanks.

Another issue with this design is that the wiper cannot remove all of the collected dirt and metal particles from the drum. The metal particles and dirt form a scum on the surface of the drum which can dry to a hard cake-like substance before reaching the wiper. Often manual cleaning is required to move all of the collected dirt from the magnetic drum.

Due to the low flow rates and the inability to remove all of the dirt and metal particles from the drum, this separator is incapable of removing all of the required dirt and metal particles from the fluid such that a portion of the dirt and metal particles are recirculated into the fluid which is recycled back to the machine using the fluid.

It would be desirable to provide a fluid particulate filter and separator apparatus which can remove substantially all of the dirt and metal particles contained in a fluid associated with a machine operation.

SUMMARY

A separator apparatus for removing solids and particulates from a fluid includes a first rotatable drum, a fluid flow passage disposed adjacent to a circumferential portion of the first rotatable drum to allow the fluid to flow from an inlet of the fluid flow passage to an outlet of the fluid flow passage. A second rotatable drum is spaced from the first rotatable drum. A source of magnetic attraction is carried with the first rotatable drum. A media belt extends in the closed loop over the first and second drums and moves by rotation of one the drums through the fluid flow passage wherein solids and particulates in the fluid and flowing from the inlet to the outlet of the fluid flow passage are drawn from the fluid and deposited on the belt. A wiper is engaged with the belt to separate the particulates deposited on the belt from the belt.

The source of magnetic attraction can be plurality of magnets spaced inside and over longitudinal length of the first rotatable drum.

A first holding tank disposed in fluid flow communication with the inlet of the fluid flow passage. A nozzle coupled to a supply of the fluid extends over substantially the entire longitudinal length of the first rotatable drum to discharge contaminated fluid into the fluid holding tank.

The belt has an upper portion extending between the first drum and the second drum. The upper portion of the belt is disposed at a downward inclined angle from the second rotatable drum to the first rotatable drum to allow fluid to flow from the belt toward the first rotatable drum.

A heat source can be disposed between the first rotatable drum and the second rotatable drum for discharging heat to a portion of the belt disposed between the first rotatable drum and the second rotatable drum to dry the particulates deposited on the belt.

A control controls rotation of the first rotatable drum between a rotation cycle and a non-rotation stationary cycle to bring successive circumferential portions of the belt into the fluid flow passage into fluid flow communication with the fluid flowing through the fluid flow passage. The control operates the rotation and non-rotation cycles of the first rotatable drum so that the rotation cycle is significantly shorter in time than the non-rotation cycle.

A method is disclosed for removing solids or particulates from contaminated fluid which includes:

providing a first rotatable drum, providing a fluid flow passage disposed adjacent to a circumferential portion of the first rotatable drum allowing fluid to flow from an inlet of the fluid flow passage to an outlet of the fluid flow passage, providing a second rotatable drum spaced from the first rotatable drum, providing a source of magnetic attraction carried by the first rotatable drum, providing a belt extending in the closed loop over the first and second drums, moving the belt rotation of the first and second drums through the fluid flow passage wherein solids in the contaminated fluid flowing from the inlet to the outlet of the fluid flow passage are drawn to and deposited on the belt, and providing a wiper relative to the belt to separate solids or particulates deposited on the belt from the media belt.

The method of indexing the belt through the fluid flow passage includes a plurality of discrete circumferential positions. In each of the plurality of the discrete positions, the belt is disposed in a stationary position in the fluid flow passage.

One position of the belt is exposed to fluid flow in the fluid flow passage in a plurality of indexed sequential stationary position.

The method defines a ratio of the rotation cycle and the non-rotation cycle of indexing of the belt wherein each non-rotational cycle is provided in a plurality of minutes and the rotational cycle of the belt is defined as being significantly less than one minute, and can be from two to three seconds.

BRIEF DESCRIPTION OF THE DRAWING

The various features, advantages, and other uses of the present particulate separator apparatus will become more apparent by referring to the following detailed description and drawing in which.

DETAILED DESCRIPTION

Figure 1:
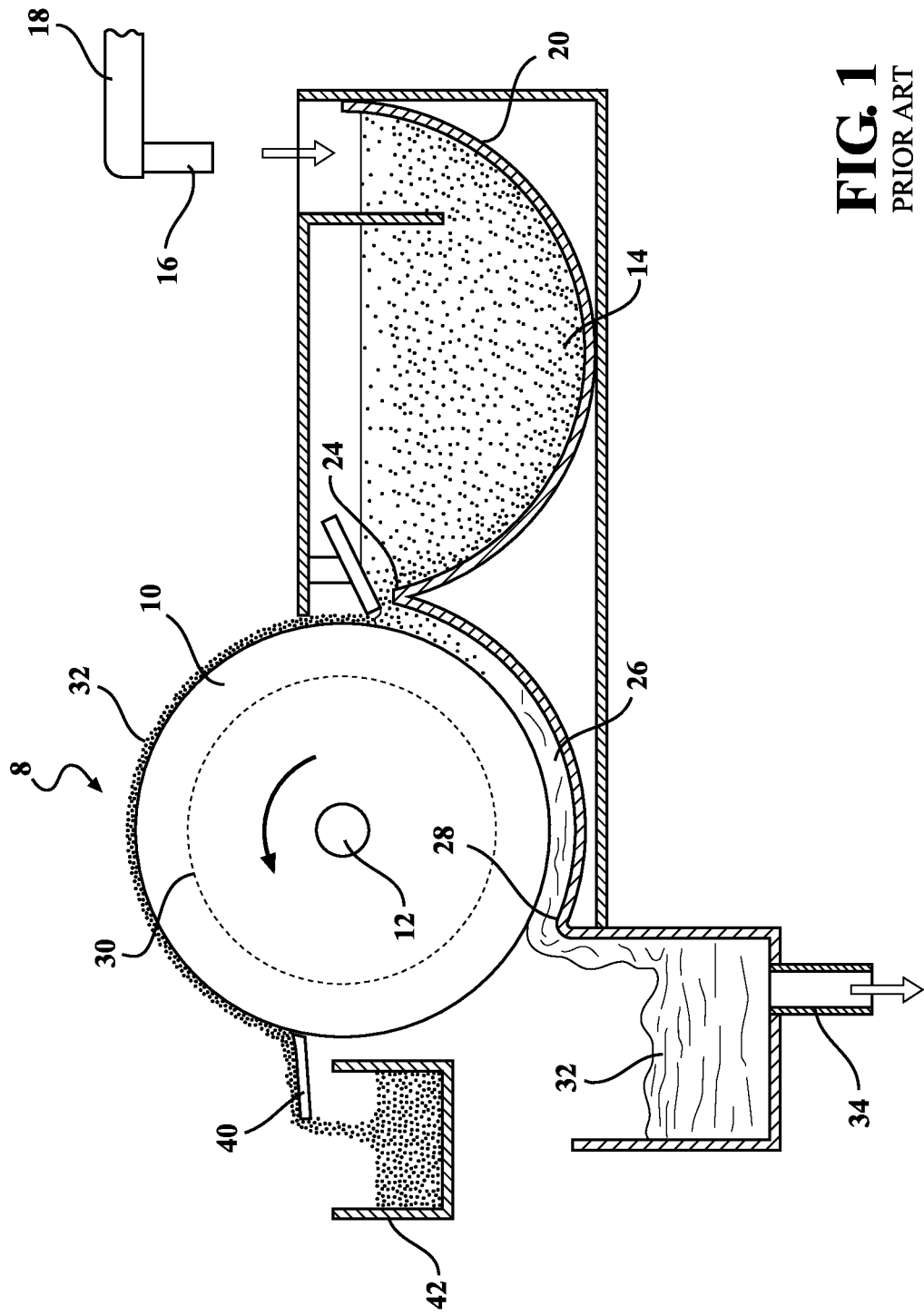
FIG. 1 is a tutorial schematic representation of a prior art magnetic fluid particulate separator.

By way of background, FIG. 1 illustrates a prior art magnetic fluid particulate separator. A cylindrical drum 10 is mounted about an axis of rotation 12 and is coupled to a power source for continuous rotation during operation of a machine which utilizes a cleaning or cooling fluid 14 which carries dirt, metal particles, suspended solids and other debris which have to be removed from the fluid before the fluid 14 can be recycled back to the machine. A nozzle 16 is coupled to a fluid supply line 18 and discharges dirty fluid containing dirt, metal particles, and other particulates from the machine or operation using the fluid 14. The nozzle 16 discharges the fluid into a holding tank 20. A baffle 22 at one upper end of the holding tank 20 forms an inlet 24 to a fluid passage 26 which extends along an angular portion of the drum 10 to an outlet 28. The fluid passage 26 which extends along substantially the entire longitudinal length of the cylindrical drum 10 causes a thin stream 15 of the fluid 14 to be exposed to magnets 30 contained within the interior of the drum 10 which attract the dirt and metal particles to the exterior surface of the drum 10 as shown by reference number 32. This removes the dirt and metal particles from the fluid 14 in an effort to substantially clean the fluid 14 of such particulates so that only clean fluid 32 collected through the outlet 28 of the fluid passage 26 can be returned through a supply line 34 to the machine operation.

A wiper or scraper 40 is positioned adjacent an exterior portion of the drum 20, such as opposite the inlet 24 to scrape or remove the particulates 32 from the exterior surface of the drum 20. The removed particulates are collected in a waste receptacle 42.

However, the required low fluid flow rates and the inability to remove all of the particulates from the fluid 14 in the flow passage 26 creates a need for an improved magnetic fluid particulate separator apparatus.

Figure 2:
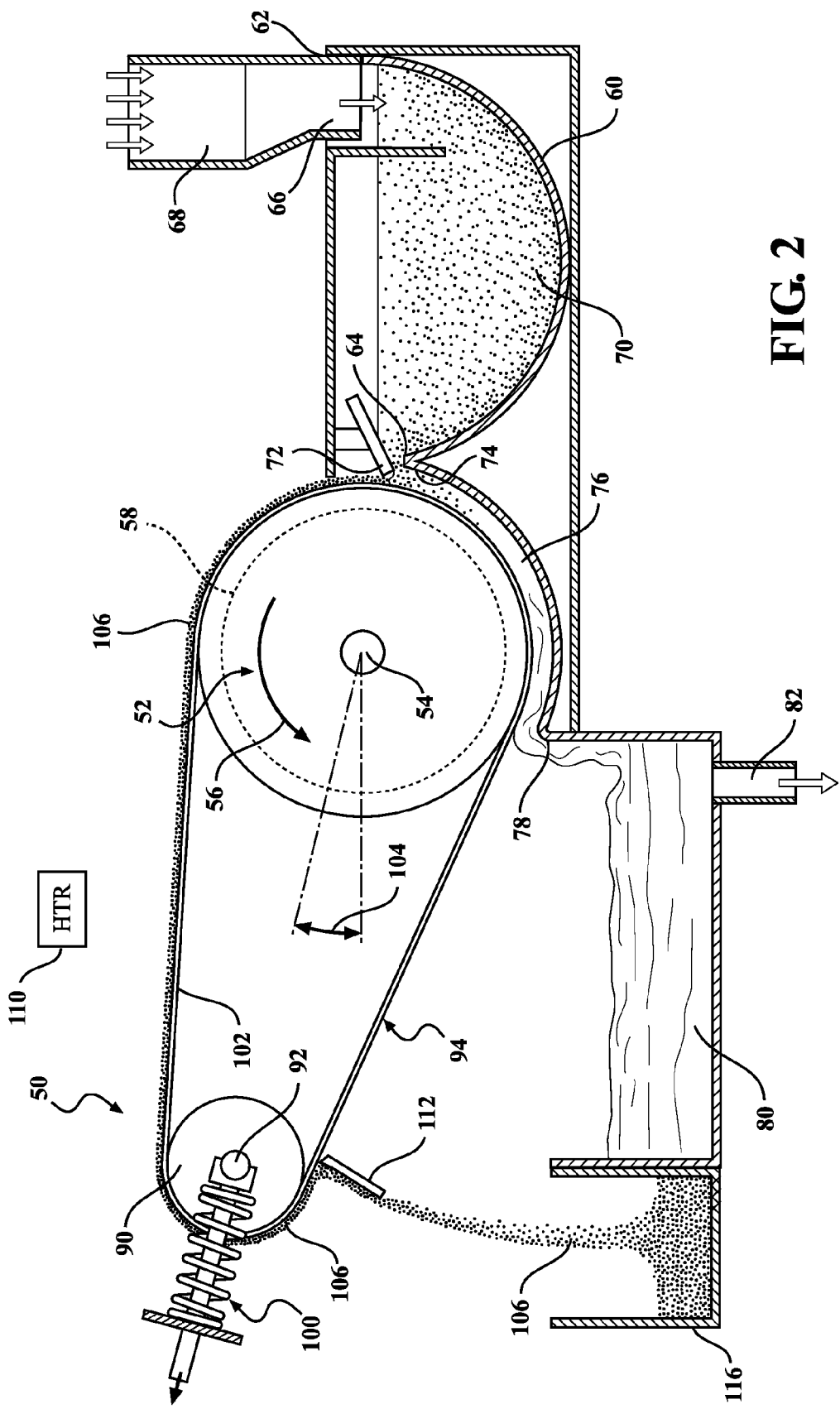
FIG. 2 is pictorial schematic representation of a magnetic fluid particulate separator of an improved magnetic fluid particulate separator.
Figure 3:
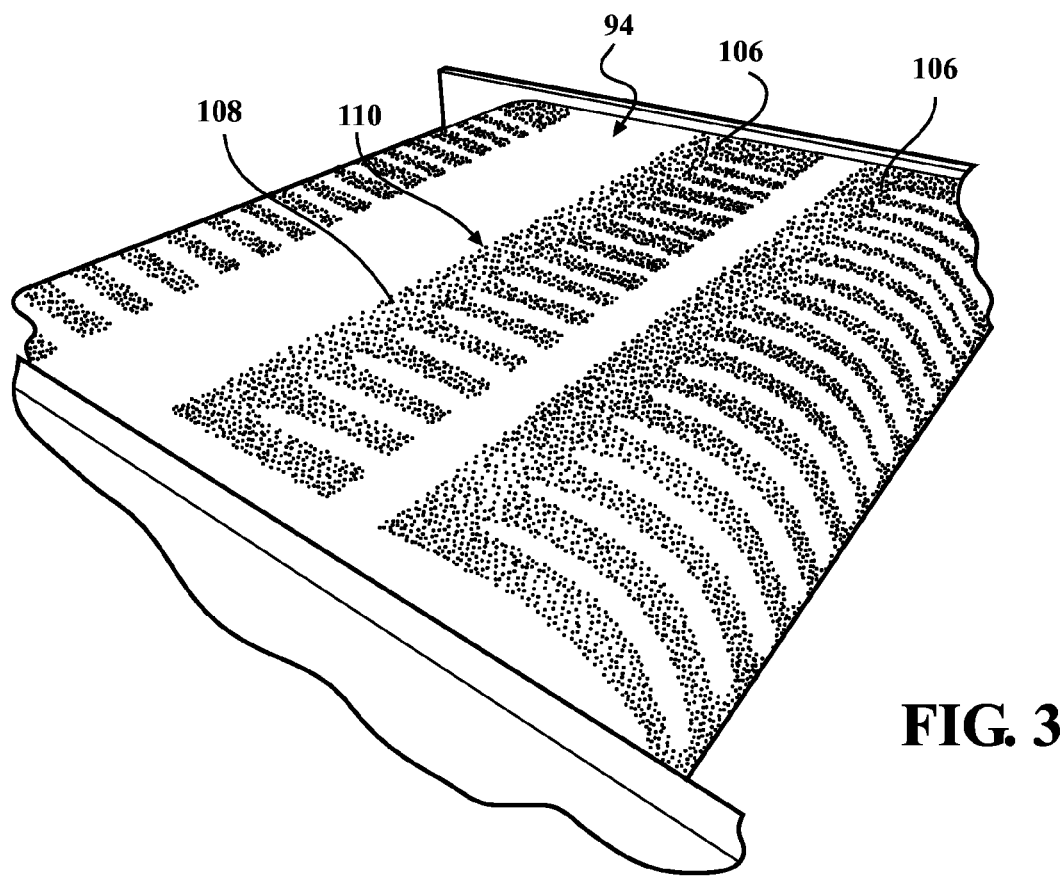
FIG. 3 is a pictorial representation of a portion of the belt mounted on the rotating drums showing a collection of particulates separated from the fluid during a plurality of sequential drum index steps.
Figure 4:
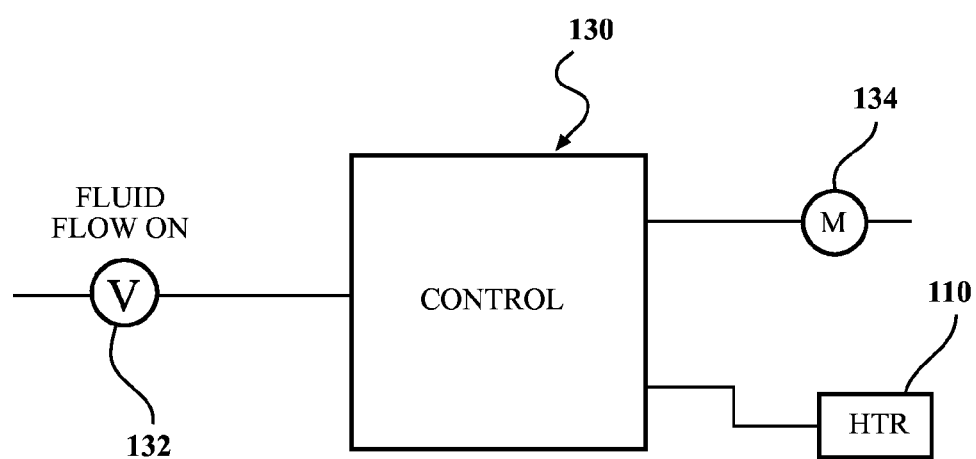
FIG. 4 is a schematic diagram of a control for operating the magnetic separator apparatus shown in FIGS. 1-3.

Such a magnetic fluid particulate separator apparatus 50 is shown in FIGS. 2-4. The apparatus 50 includes a first drum 52. The first drum 52 is mounted on a rotatable axle 54 for movement in the direction of the arrow 56 shown in FIG. 2. The first drum 52 has a relatively large diameter, cylindrical shape with a length shown in FIG. 3 between opposed ends.

A source of magnetic attraction is providing in or on the first drum 52, and can be in the form of one or more magnets 58 mounted interiorly within the first drum 52, generally adjacent the exterior surface of the first drum 52. The magnets 58 maybe one continuous magnet extending across the inner circumference and longitudinal length of the first drum 52 or the plurality of ring-like magnets longitudinally spaced apart across the longitudinal extent of the first drum 52.

The first drum 52 is located next to a first holding tank 60 which has an inlet 62 and an outlet 64. The inlet 62 receives a nozzle or discharge opening 66 attached to a fluid supply line 68 carrying contaminated fluid filled with dirt, metal particles, and other particulates, from a machine or machine operation which utilized the fluid. It should be noted that the fluid supply line opens to an accumulator 68 which extends across substantially the entire length of the first drum 52. Likewise, the nozzle 66 also extends substantially across the entire length of the first drum 52.

Fluid is discharged through the nozzle 66 into the holding tank 60 where it accumulates until the level of fluid 70 in the holding tank 60 exceeds the height of the outlet 64. A baffle 72 at the outlet 64 forms a narrow opening acting or an inlet 74 to a fluid passage 76 which extends along a circumferential portion of the first drum 52 to direct contaminated fluid 70 from the holding tank 60 along a portion of the first drum 52 to an outlet 78. The outlet 78 opens to a second holding tank or receptacle 80, which has a discharge path 82 extending back to the machine to recycle clean fluid back to the machine related or machine operations.

The apparatus 50 includes a second drum 90 mounted about an axle 92. The second drum 50 does not need to be powered as a belt 94 extends around the first drum 52 and the second drum 90 in a closed loop. In this manner, powered rotation of the first drum 50 will cause similar rotation of the second drum 90. Alternately, the second drum 90 may be exclusively coupled to a rotative power source. In this case, rotation of the second drum 90 by the rotational power source will cause rotation of the first drum 52 via the belt 94.

Since the belt 94 can be formed of a fabric-like material subject to elongation during use, a tensioning device, such as a spring biased tensioning device 100, may be coupled to the axle 92 of the second drum 90 to automatically or manually change the position of the axle 92 of the second drum 90 relative to the axle 54 of the first drum 52 to keep a predetermined tension on the belt 94.

According to one aspect of the apparatus 50, the height of the upper most edge of the second drum 90 is positioned vertically above the uppermost vertical extent of the outer circumference of the first drum 54. This places the upper portion 102 of the belt 94 at a downward extending slope or angle 104 from the second drum 90 to the first drum 54. This downward slope or angle causes any fluid carried by the belt 94 to drain back along the length of the upper portion 102 of the belt 94 into the fluid passage 76.

The downward angle 104 of the upper portion 102 of the belt 94 may be achieved in a number of different ways. In one aspect, the axle 92 of the second drum 90 is located vertically above the axle 54 of the first drum 52 thereby creating the angle 104 relative to horizontal, as shown in FIG. 2. The angle 104 in conjunction with the relative relationship of the diameters of the first drum 52 and the second drum 90 is selected to create the downward slope of the upper portion 102 of the belt 94 between the first drum 52 and the second drum 90.

The belt 94 is formed of a non-porous material so that any dirt, metal particles, solids or other particulates attracted to the exterior surface of the belt 94 by the magnets 58 in the first drum 52 are deposited on the exterior surface of the belt 94.

During the cyclic rotation of the first drum 52, as described hereafter, such metal particles and other particulates, after the first drum 52 has indexed and rotated a sufficient amount to move such particulates denoted by reference number 106 in FIGS. 2 and 3 out of the fluid flow passage 76, will dry into a cake-like substance for transport along the upper portion 102 of the belt 94.

It can be seen in FIG. 3 that the particulates 108 and 110 form individual, spaced tracks on the exterior surface of the belt 94. The dark tracks in FIG. 3 represent an accumulation of dirt, metal particles and other contaminates removed from the fluid 70 by the magnetic source 58. The individual tracks of the particles 106 and the track segments 108 and 110 on the belt 94 shown in FIG. 3 illustrate the spaced longitudinal position of the magnetic source 58 with the interior of the first drum 52 and the individual indexed positions of the belt 94.

Since it is easier to remove the accumulated particulates 106 from the belt 94 when the particulates 106 are dry or substantially dry, a heater or dryer apparatus 110 may be mounted adjacent the upper portion 102 of the belt 94 to remove additional mounts of fluid from the particulates 106 deposited on the belt 94.

A wiper or scraper 112, which can be in the form of a blade, is mounted at a suitable position with respect to the second drum 90. One edge of the wiper 112 is disposed in substantial contact with, or is closely spaced from, the exterior surface of the belt 94 to scrape off the particulates 106 deposited on the belt 94. The removed particulates 106 are collected in a waste receptacle 116.

As shown in FIG. 2, the wiper 112 can, for example, be positioned below the axle 92 of the second drum 90. This position allows the wiper 112 to scrape off particulates 106 from the belt 94 as well as allowing gravity to pull the particulates 106 from the belt 94 which are not securely adhered to the belt 94. It can be seen that the waste receptacle 116 is positioned to collect particulates 106 scraped off the belt 94 by the wiper 112 as well as any particulates falling by gravity from the belt 94.

It should also be noted that, contrary to the prior art magnetic fluid particulate separator 8 shown in FIG. 1, the particulates 106 separated from the contaminated fluid 70 by the first drum 52 are not held in magnetic attraction on the upper portion 102 of the belt 94 or when the belt 94 moves around the second drum 90. Since the particulates 106 are not held in magnetic attraction on the belt 94 as in the separator 8 shown in FIG. 1, the wiper 112 can remove greater portions of the particulates 106 from the belt 94.

Figure 5:
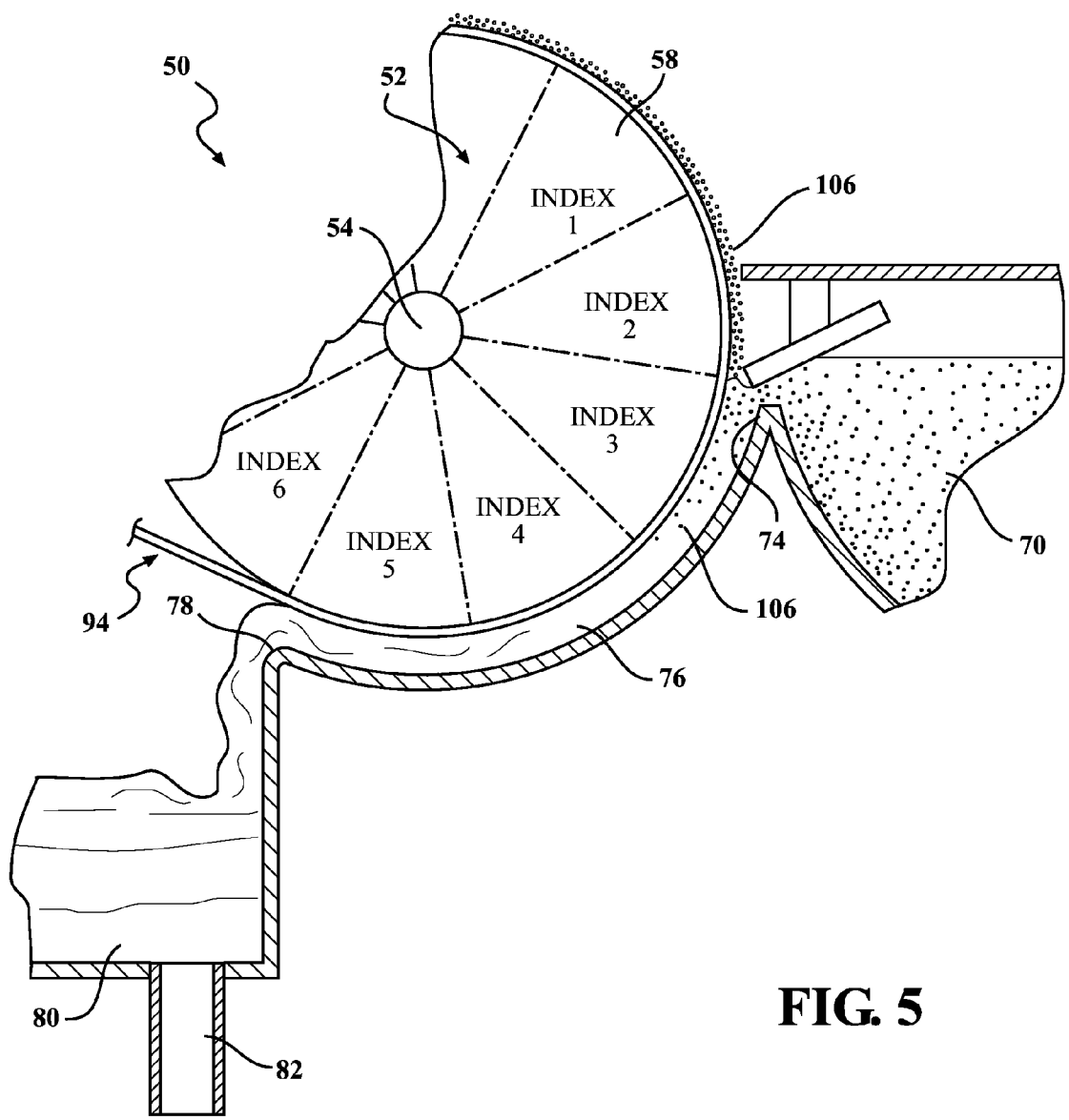
FIG. 5 is an enlarged, partial side elevational view of the magnetic separator apparatus showing individual index stages of the rotation of the magnetic separator apparatus.

Referring now to FIGS. 4 and 5, there is depicted the control and sequence of operation of the apparatus 50. A control or controller 130 is provided to control the selective indexing rotation of the first drum 52. The control 130 may be any suitable control, such as a programmable logic controller, which receives inputs, such as a signal 132, indicating that fluid is flowing through the nozzle 66. The control 130 also selectively activates outputs, such as the heater 110 and a power source, such as a motor 134, for rotating the axle 54 of the first drum 52 or the second drum 92.

It should be noted that the motor 134 may be coupled to the axle 92 of the second drum 90, as described above, to cause simultaneous rotation of the first and second drums 52 and 90 via the interconnected closed loop belt 94.

As shown in FIG. 5, the first drum 52 is indexed in a plurality of discrete index stages or positions. Each index stage remains in the fluid passage 76 for a considerable period of the portion of the first drum 50 thereby enabling additional quantities of particulates 106 to be removed from the fluid 70 flowing through the passage 76.

As shown by example in FIG. 5, index position 6 is adjacent the fluid passage 76 at the outlet 78 of the fluid passage 76. For a particular fluid flow rate, such as 7,000 liters per hour, and for a given diameter first drum 52, the control 130 may activate the motor 134 to rotate the first drum 52 in a rotation cycle of less than one minute, such as three seconds, before stopping rotation of the first drum 52. The first drum 52 remains in a non-rotation, stationary position for a second predetermined period which is substantially longer than the "on" period of rotation. For the given flow rate described above, and the illustrated diameter of the first drum 52, the control 130 can activate the motor 154 to rotate the first drum 52 for two to three seconds followed by a twenty minute non-rotation period during which the first drum 52 remains in a stationary position.

In this example, as the index portion 6 engages the belt 94 at the outlet 76 of the fluid passage 76, fluid flowing pass the index portion 6 will be clean of particulates since most of the particulates have been removed by the preceding index positions of the first drum 52. Upon the next indexing or rotation of the first drum 52 where the index portion 6 is moved to index position 5, a portion of the belt 94 in contact with the segment of the first drum 52 will now be exposed to the fluid flowing through the fluid passage 76 and can remove dirt, metal particles and other particulates from the fluid through magnetic attraction by the magnets 58.

The accumulation or deposit of the particulates 106 removed from the fluid when the fluid passage 76 illustrated by the increasing height of the particulates 106 on the belt 94 as it moves through the fluid flow passage 75.

This sequence of a short "on" time of rotation followed by a significantly longer "off" time of stationary position indexes a specific segment of the belt 94 from index portions 6 through index portions 2. Index portions 3, 4, and 5 cause the specific segment of the belt 94 to remain in contact with the fluid flowing through the fluid passage 76 for additional separation of dirt, metal particles and other contaminates from the fluid 70. When the particular segment of the belt 94 reaches the index position 2, the specific segment of the belt 94 has moved out the fluid 70. Due to illustrated distance between the first drum 52 and the second drum 90, and the described three-second "on" followed by the twenty minute "off" rotation cycle of the first drum 52, the particulates 106 on the exposed upper portion 102 of the belt 94 remain clear of fluid for up to 1.5 hours. This allows adequate time for the particulates 105 to dry or to substantially dry to a cake-like substance which, while adhering to the belt 94, is easily removed from the belt 94 by the wiper 112. At higher flow rates or with a dirtier fluid, the heater 110 may be activated by the control 190 to remove moisture from the particulates 106 on the upper portion of the belt 94.

It will be understood that the above example a three second "on" time rotation period followed by a significantly longer twenty-minute period of "off," stationary, non-rotation period of the first drum 52 can be varied depending upon the fluid flow rate from the nozzle 66, and the quantity of solids in the fluid. Such variables allow the control 130 to be reprogrammed for increased or decreased "on" and "off" times. The "on" and "off" times do not have to be both changed, as the "on" time can remain at three-seconds and the "off" time increased to 30 minutes for fluids containing a higher concentrations of solids.

What is claimed is:

1. A separator apparatus for removing particulates from a fluid comprising:
   a first rotatable drum mounted on a first rotatable axle having a first axis of rotation at a first elevation;
   a fluid passage disposed adjacent to a circumferential portion of the first rotatable drum to dispose contaminated fluid flowing from an inlet of the fluid passage to an outlet of the fluid passage in fluid communication with the first rotatable drum;
   a second rotatable drum spaced from the first rotatable drum and mounted on a second rotatable axle having a second axis of rotation at a second elevation that is higher than the first elevation;
   a source of magnetic attraction carried with the first rotatable drum;
   a closed loop media belt comprising filter media and extending around the first and second rotatable drums, the closed loop media belt moving by rotation of the first and second rotatable drums through the fluid passage wherein particulates in the fluid flowing through the fluid passage are deposited on the closed loop media belt; and
   a wiper blade configured to engage the closed loop media belt to scrape the particulates from the closed loop media belt.

2. The apparatus of claim 1 wherein the source of magnetic attraction comprises:
   a plurality of magnets laterally spaced over a longitudinal length of the first rotatable drum.

3. The apparatus of claim 1 further comprising:
   a fluid holding tank disposed in fluid flow communication with the inlet of the fluid passage, the fluid holding tank and the inlet extending over a longitudinal extent of the first rotatable drum.

4. The apparatus of claim 3 further comprising:
   a nozzle coupled to a supply of fluid extending over substantially an entire longitudinal length of the first rotatable drum to discharge fluid into the fluid holding tank.

5. The apparatus of claim 1 wherein:
   the closed loop media belt comprises an upper portion extending between the first rotatable drum and the second rotatable drum; and
   the upper portion of the closed loop media belt is disposed at a downward inclined angle from the second rotatable drum to the first rotatable drum to allow fluid to flow from the belt toward the first rotatable drum.

6. The apparatus of claim 1 further comprising:
   a heat source disposed between the first rotatable drum and the second rotatable drum for applying heat to a portion of the closed loop media belt between the first rotatable drum and the second rotatable drum.

7. The apparatus of claim 1 further comprising:
   a control controlling rotation of the first rotatable drum in successive rotation cycles and non-rotation, stationary cycles to bring successive angular portions of the belt into the fluid passage into fluid flow communication with contaminated fluid flowing through the fluid passage.

8. The apparatus of claim 7 wherein:
   the control operates the rotation and non-rotation, stationary cycles of the first rotatable drum, and the rotation cycle is significantly shorter in time than a predetermined non-rotation, stationary cycle.

\* \* \* \* \*